US012078009B2

(12) United States Patent
Soler et al.

(10) Patent No.: US 12,078,009 B2
(45) Date of Patent: Sep. 3, 2024

(54) GARAGE DOOR SYSTEM

(71) Applicant: E.S. WINDOWS, LLC, Miami, FL (US)

(72) Inventors: John-Michael Soler, West Palm Beach, FL (US); Samir Sabagh, Miami, FL (US); Jeferson Javier Zapata Movilla, Pompano Beach, FL (US)

(73) Assignee: E.S. WINDOWS, LLC, Miami, FL (US)

( * ) Notice: Subject to any disclaimer, the term of this patent is extended or adjusted under 35 U.S.C. 154(b) by 0 days.

(21) Appl. No.: 18/055,780

(22) Filed: Nov. 15, 2022

(65) Prior Publication Data

US 2024/0159091 A1 May 16, 2024

(51) Int. Cl.

| | |
|---|---|
| ***E06B 7/22*** | (2006.01) |
| ***E05D 3/02*** | (2006.01) |
| ***E05D 5/06*** | (2006.01) |
| ***E05D 15/22*** | (2006.01) |
| ***E06B 3/70*** | (2006.01) |

(52) U.S. Cl.

CPC .................. *E06B 7/22* (2013.01); *E05D 3/02* (2013.01); *E05D 5/06* (2013.01); *E05D 15/22* (2013.01); *E06B 3/70* (2013.01); *E05D 2015/225* (2013.01); *E06B 2003/7044* (2013.01)

(58) Field of Classification Search

CPC ..... E06B 2003/7044; E06B 2003/9616; E06B 7/22

USPC .......................................... 49/120, 368, 370

See application file for complete search history.

(56) References Cited

U.S. PATENT DOCUMENTS

| | | | | |
|---|---|---|---|---|
| 2,200,277 A * | 5/1940 | Howie | B62D 33/04 | 16/366 |
| 4,854,365 A * | 8/1989 | Juneau | E06B 3/485 | 160/40 |
| 5,168,915 A | 12/1992 | Lafleur | | |
| 6,586,085 B1 * | 7/2003 | Jella | B32B 3/26 | 52/800.1 |
| 10,280,668 B2 * | 5/2019 | Kelley | E05D 15/242 | |
| 2002/0112444 A1 * | 8/2002 | Lacasse | E06B 3/485 | 52/800.1 |

(Continued)

FOREIGN PATENT DOCUMENTS

| | | |
|---|---|---|
| DE | 9308439 U1 | 8/1993 |
| EP | 0133507 A2 | 2/1985 |
| EP | 2460970 A1 | 6/2012 |

OTHER PUBLICATIONS

International Search Report for PCT application No. PCT/US2023/037260 mailed Jun. 3, 2024.

*Primary Examiner* — Gregory J Strimbu
(74) *Attorney, Agent, or Firm* — Lando & Anastasi, LLP

(57) ABSTRACT

A garage door assembly includes at least one track and a first panel and a second panel that are movable along the at least one track. The first panel and the second panel are connected by a hinge. The first panel and the second panel each have a first end portion including a planar surface, a recess defined in the planar surface, and a rail extending from a trough of the recess, the rail having a height that is less than a depth of the recess. A channel member is secured to the rail of the first panel. The channel member extends beyond the planar surface of the first panel and is configured to receive the rail of the second panel.

12 Claims, 8 Drawing Sheets

(56) References Cited

U.S. PATENT DOCUMENTS

| | | | | |
|---|---|---|---|---|
| 2002/0170687 | A1* | 11/2002 | Wright | E06B 3/485<br>160/229.1 |
| 2006/0254730 | A1* | 11/2006 | Wood | E06B 3/485<br>160/236 |
| 2009/0025334 | A1* | 1/2009 | Aquilina | E06B 3/485<br>52/745.15 |
| 2019/0003242 | A1* | 1/2019 | Schank | E06B 3/488 |

* cited by examiner

GARAGE DOOR SYSTEM

BACKGROUND OF DISCLOSURE

The present disclosure relates generally to doors that include panels, such as garage doors, and more particularly to a garage door system and a roller assembly used with such a garage door system.

Present day garage doors include panels that may allow wind or rain to pass through gaps between the panels and into the interior space of a garage. Present day garage doors are also at risk of damage due to wind because adjacent edges of panels of the garage door do not directly engage each other.

SUMMARY OF DISCLOSURE

An aspect of the present disclosure is directed to a garage door system comprising at least one track; a first panel and a second panel connected by a hinge, each of the first panel and the second panel having a first end portion including a planar surface, a recess defined in the planar surface, and a rail extending from a trough of the recess, the rail having a length that is less than a length of the recess; and a channel member secured to the rail of the first panel, the channel member extending beyond the planar surface of the first panel and being configured to receive the rail of the second panel.

In some embodiments, the channel member is secured to the rail of the first panel by a fastener.

In some embodiments, the garage door system further comprises at least one roller, wherein each roller consists essentially of a first portion having a first diameter rotatably secured to the hinge; and a second portion having a second diameter greater than the first diameter of the first portion and configured to engage a respective track of the at least one track, wherein the first portion is integrally formed with the second portion.

In some embodiments, the garage door system further comprises at least one roller, wherein each roller comprises a first portion having a first diameter rotatably secured to the hinge; and a second portion having a second diameter greater than the first diameter of the first portion and configured to engage a respective track of the at least one track, wherein the first portion is integrally formed with the second portion.

In some embodiments, the hinge includes a first plate secured to the first panel and a second plate secured to the second panel, the first plate and the second plate having a shape that is at least substantially rectangular.

In some embodiments, the garage door system further comprises at least one roller, wherein each roller consists essentially of a first portion having a first diameter rotatably secured to the hinge; and a second portion having a second diameter greater than the first diameter of the first portion and configured to engage a respective track of the at least one track, wherein the first portion is integrally formed with the second portion.

In some embodiments, the first plate includes a pair of flanges configured to support the roller.

In some embodiments, the at least one track is two tracks positioned on opposite sides of the first panel.

In some embodiments, the channel member includes a first channel wall and a second channel wall configured to receive the rail or the adjacent panel therebetween.

In some embodiments, the garage door system further comprises a strip of flexible material secured to each of the first channel wall and the second channel wall and configured to engage the recess of the adjacent panel.

In some embodiments, the first end portion of the first panel includes a strip of sealing material and the first end portion of the second panel includes a strip of sealing material configured to engage the strip of sealing material of the first panel when the garage door is in a closed position.

In some embodiments, the channel member is configured to allow the rail of an adjacent panel to disengage the channel member when the first panel and the second panel are rotated relative to each other.

Another aspect of the present disclosure is directed to a garage door system comprising at least one track; a first panel and a second panel connected by a hinge; and a roller including a shaft having a first portion having a first diameter rotatably secured to the hinge and a second portion having a second diameter greater than the diameter of the first portion, the roller further including a roller insert secured to the second portion of the shaft, wherein the first portion of the shaft is integrally formed with the second portion of the shaft.

In some embodiments, the hinge includes a first plate secured to the first panel and a second plate secured to the second panel, the first plate and the second plate having a shape that is at least substantially rectangular.

In some embodiments, the first plate includes a pair of flanges configured to support the roller.

In some embodiments, the roller insert is fabricated from polyurethane. In some embodiments, the roller insert is fabricated from nylon.

Another aspect of the present disclosure is directed to a garage door system comprising two tracks mounted adjacent a garage door opening; a garage door including at least a first panel and a second panel connected by a hinge, each of the first panel and the second panel having a first end portion including a planar surface, a recess defined in the planar surface, and a rail extending from a trough of the recess, the rail having a height that is less than a depth of the recess; and a channel member secured to the rail of the first panel, the channel member extending beyond the planar surface of the first panel and being configured to receive the rail of the second panel.

In some embodiments, the channel member is secured to the rail of the first panel by a fastener.

In some embodiments, the garage door system further comprises at least one roller, wherein each roller including a first portion having a first diameter rotatably secured to the hinge; and a second portion having a second diameter greater than the first diameter of the first portion and configured to engage a respective track of the at least one track, wherein the first portion is integrally formed with the second portion.

In some embodiments, the channel member includes a first channel wall and a second channel wall configured to receive the rail or the adjacent panel therebetween.

In some embodiments, the channel member is configured to allow the rail of an adjacent panel to disengage the channel member when the first panel and the second panel are rotated relative to each other.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
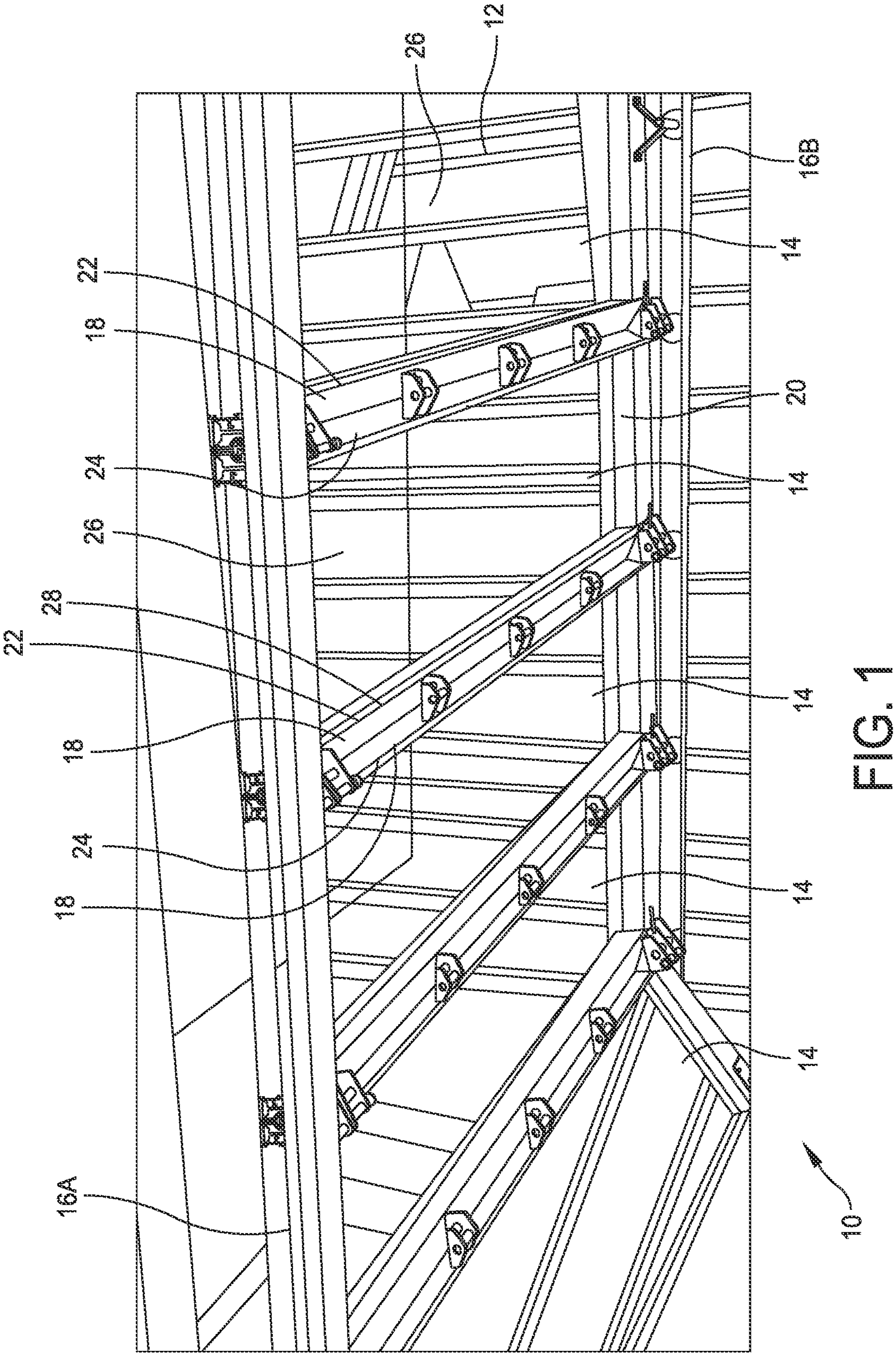
FIG. 1 is a perspective view of a portion of a garage door showing a garage door system and roller assembly according to the present disclosure.

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The present disclosure provides a garage door system. The system includes a garage door that is movable along a track that is secured to a structure, such as a frame or a building. In some embodiments, the building is a residential garage. In some embodiments, building is a commercial garage or an industrial garage. To move the garage door along the track, the system may include a motor that is linked to the garage door.

The track includes a surface configured to engage a feature of the door so the track supports the door as the door travels along the track. In some embodiments, the track includes a first linear portion and a second linear portion that are connected by a curved portion. In some embodiments, the first linear portion of the track extends in a vertical direction and/or extends in a horizontal direction. In some embodiments, the second linear portion of the track extends in a vertical direction and/or extends in a horizontal direction.

In some embodiments, the track may be formed of an extruded piece of material.

In some embodiments, the garage door system includes two tracks, with the two tracks positioned near opposite sides of the frame for supporting opposite sides of the door.

The garage door may include a plurality of panels that are movable along the track, as described in further detail below. The direction of movement of the panels is along the track of the garage door system. Accordingly, in some embodiments the panels of the door are movable in a vertical direction, a horizontal direction, or another direction along the track to move the door between the open position and the closed position. In this way, the panels of the garage door are movable from an open position to a closed position. In some embodiments, the door rests on a ground surface when the door is in the closed position and the door is suspended over the ground and parallel to the ground when the door is in the open position.

To improve operation of the garage door, adjacent panels are configured to securely engage each other to improve the structural rigidity of the door and improve the resistance of the door to wind and environmental elements when the door is in the closed position. For example, the adjacent panels may have a tongue and groove engagement with each other to ensure proper engagement of the adjacent panels with the door is in the closed position, as described further below.

Adjacent panels are connected to each other so they may travel as a single door along the linear portions of the track and/or the curved portion of the track. For example, in some embodiments, adjacent panels are connected by hinges that allow the door to move along a curved portion of the track.

To allow each panel to travel along the track, each panel is supported on at least one roller configured to travel along the track. In this way, the panels of the door are movable as a single door along the track, which may include one or more curved portions as discussed further herein. In some embodiments, each roller is supported on a respective one of the hinges.

Each roller is configured to resist bending failure during operation of the garage door. The roller includes a first portion securable to one of the hinges and a second portion that is configured to engage the track. In some embodiments, the first portion has a cylindrical shape having a first diameter configured to be rotatably received in a circular opening in a body of one of the hinges. In some embodiments, the second portion has an annular shape having a second diameter configured to be received in the track. The second portion is configured to roll along the track as a user moves the door between the open position and the closed position.

Turning now to FIG. 1, a garage door system is generally indicated at 10. The garage door system includes a door 12 having a plurality of panels, each indicated at 14, that are movable along a pair of tracks 16A, 16B. Each of the plurality of panels 14 is connected to one or more adjacent panels 14. The panels 14 are movable together along the tracks 16A, 16B to allow a user to move the panels 14 from a closed position in which one of the panels is in direct engagement with a support surface, such as the ground, to an open position in which the panels are suspended over the support surface in spaced apart relation with the support surface. FIG. 1 shows the door 12 suspended in the open position.

Each panel 14 includes an outer frame 18. In FIG. 1, the outer frame 18 has two side edges, each indicated at 20, a first long edge 22, and a second long edge 24. When the garage door 12 is in the closed position, the first long edge 22 of the frame 18 is below the second long edge 24 of the frame 18, and the first long edge 22 of the frame 18 is configured to be adjacent the second long edge 24 of an adjacent frame 18.

It is noted that prior to use of each frame 18, the spatial relationship of the first long edge, indicated at 22 in FIG. 1, and the second long edge, indicated at 24 in FIG. 1, may be reversed as desired by a user, as discussed further below.

Within the outer frame 18, each panel 14 may include one or more materials as desired by a user. For example, the panel may include a central portion 26 that is made of the same material as the frame 18 or a different material from the frame 18. In some embodiments, the central portion 26 is made of glass, as shown in FIG. 1. In some embodiments, the central portion 26 is made of metal. In some embodiments, the central portion 26 is integrally formed with the frame 18.

The panels 14 may be made of various materials including wood, vinyl, glass, metal, or other materials commonly used for garage doors.

To connect adjacent panels 14 and allow them to move along the tracks 16A, 16B, the frame 18 of each panel includes a surface 28 that is configured to be fastened to one or more hinges which support one or more rollers, which are each described in further detail below.

Figure 2A:
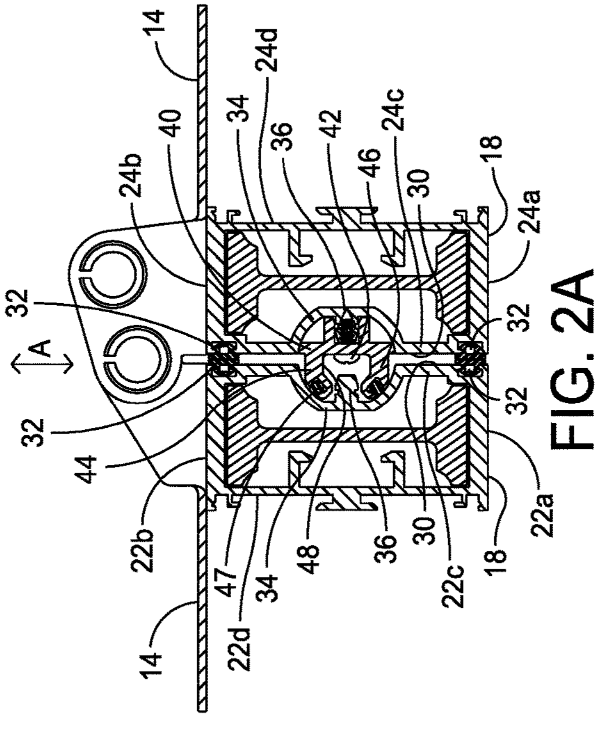
FIG. 2A is a cross sectional view of two panels of the garage door shown in FIG. 1 engaging each other.
Figure 2B:
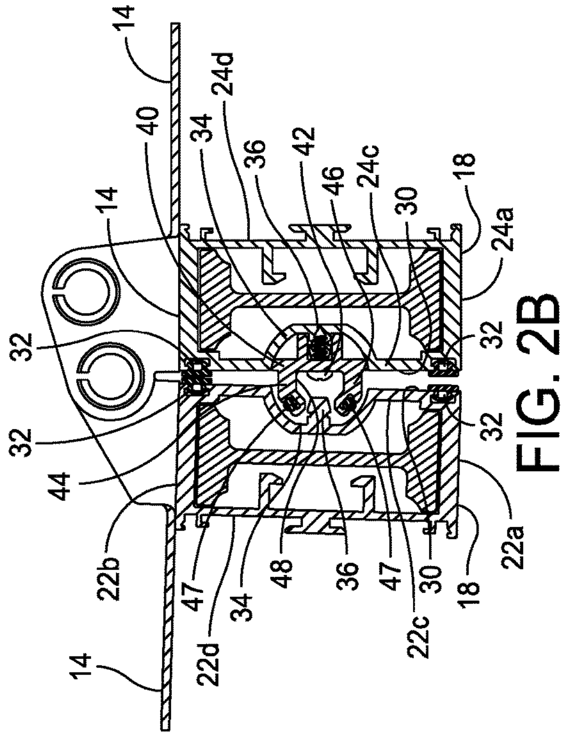
FIG. 2B is a cross sectional view of two panels of the garage door shown in FIG. 1 rotated relative to each other.
Figure 2C:
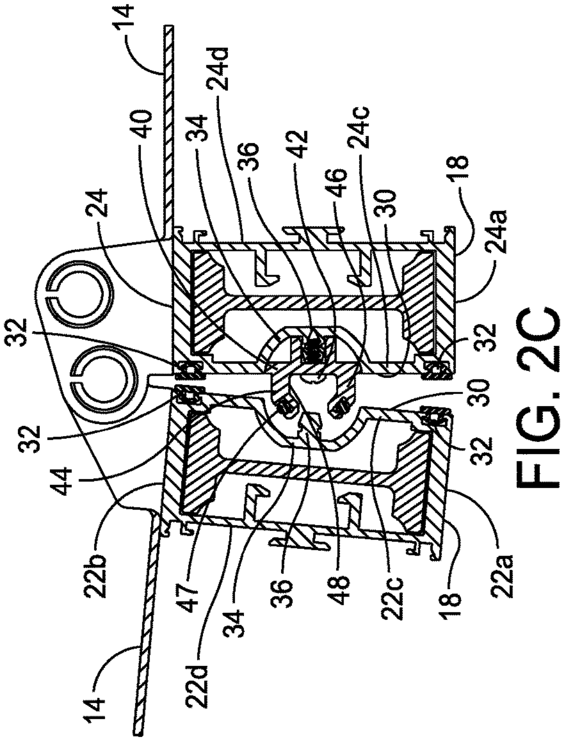
FIG. 2C is a cross sectional view of two panels of the garage door shown in FIG. 1 further rotated relative to each other.
Figure 2D:
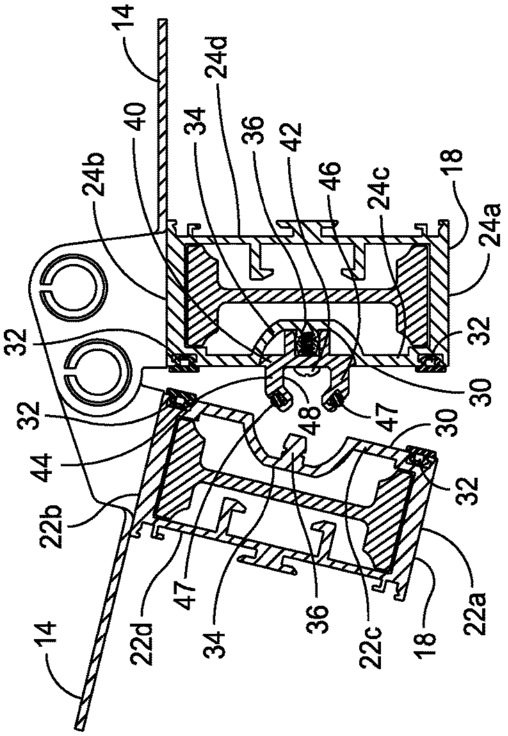
FIG. 2D is a cross sectional view of two panels of the garage door shown in FIG. 1 further rotated relative to each other.

Referring additionally to FIGS. 2A-2D and FIG. 3, the lefthand frame 18 includes a first long edge 22*a*, a second long edge 22*b*, a first connecting edge 22*c*, and second connecting edge 22*d*. Similarly, the righthand frame 18 includes a third long edge 24*a*, a fourth long edge 24*b*, a third connecting edge 24*c*, and a fourth connecting edge 24*d*. Each frame 18 further includes an I-beam structure 3, which provides elongate support to the frame. As shown, the first long edge 22*a* and the third long edge 24*a* of the frames 18 of the panels 14 facilitate engagement of adjacent panels 14. FIG. 2A shows the first long edge 22*a* of the frame 18 of a first panel 14 engaging the third long edge 24*a* of the frame 18 of a second panel 14. When the panels 14 are in the closed position, the first long edge 22*a* of the frame 18 of the first panel 14 is in direct facing engagement with the third long edge 24*a* of the frame 18 of the second panel 14. FIGS. 2B, 2C, and 2D show the adjacent panels 14 when the first long edge 22*a* of the frame 18 of the first panel 14 is rotated relative to the third long edge 24*a* of the second panel 14.

Each of the first and third connecting edges 22*c*, 24*c* includes a planar surface 30. The first and third connecting edges 22*c*, 24*c* each further includes a strip of sealing material 32 at either edge of the planar surface 30 that is configured to engage a similar strip of sealing material 32 of the adjacent frame 18. The engagement of the strips of sealing material 32 of adjacent panels improves the resistance of the garage door 12 to the elements. For example, when the strips of sealing material 32 of adjacent panels 14 are in direct engagement with each other, as shown in FIG. 2A, they prevent rain and debris from passing through the door at the joint between the adjacent panels 14. The sealing material may be an elastic material. In some embodiments, the sealing material may include an elastomer, a thermoplastic, and/or another material.

Towards a central portion of the planar edge portion, each of the first and third connecting edges 22*c*, 24*c* includes a recess 34. A rail 36 extends from a trough of the recess 34 towards the surface 30 of the respective connecting edges 22*c*, 24*c*. The length of the rail 36 is less than the length of the recess 34, so the rail 36 does not extend beyond the planar surface 30 of the planar edge portion of the panel 14.

Figure 3:
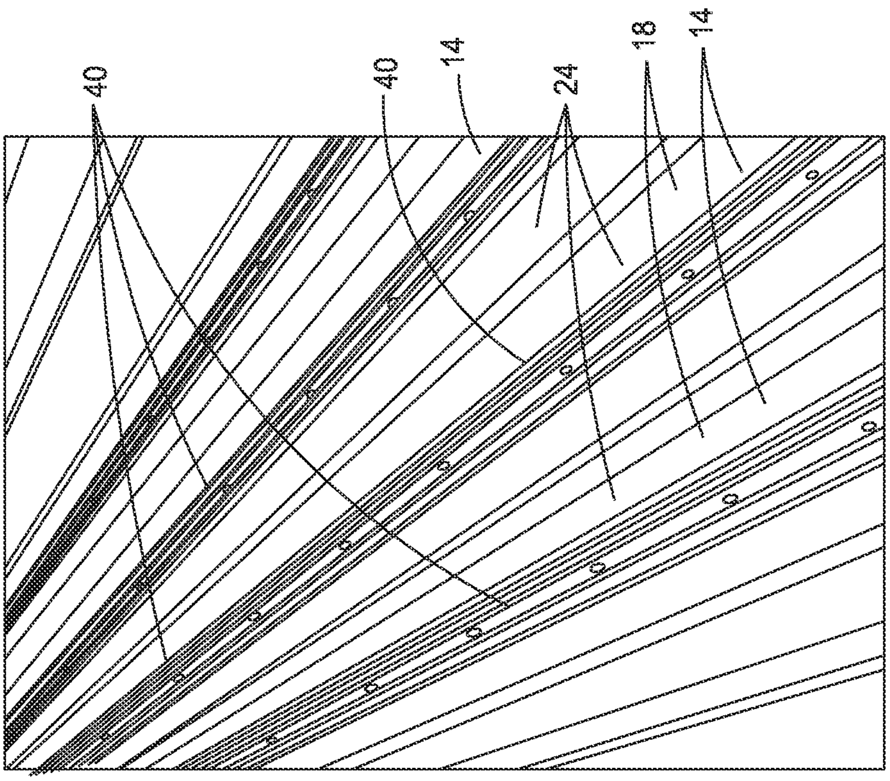
FIG. 3 is a perspective view of an end of a panel including a plurality of channel members.

As best shown in FIG. 3, the second long edge 24 of the first panel 14 includes a channel member 40 that is fastened to the rail 36. The channel member 40 may be fastened to the rail 36 by a fastener 42, such as a screw.

The channel member 40 includes a first channel wall 44 and a second channel wall 46 that extend beyond the planar surface 30 of the panel 14 so the channel member may engage the rail 36 of the adjacent frame 18. A strip of flexible material 47 is secured to the end of each of the first channel wall 44 and the second channel wall 46 to engage an internal surface of a trough of the recess 34 of the adjacent panel 14.

The first channel wall 44 and the second channel wall 46 define therebetween a convex internal surface 48 that is configured to engage the rail 36 of the adjacent panel 4 when the door 12 is in the closed position. Together the rail 36 and the internal surface 48 of the channel member 40 prevent displacement of the panels with respect to each other in the direction along arrow A in FIG. 2A. When the adjacent panels 14 are rotated relative to each other as shown in FIG. 2D, the rail 36 is not received between the first channel wall 44 and the second channel wall 46.

In some embodiments, the channel member 40 runs the full length of the rail 36. In some embodiments, the channel member 40 is shorter than the rail. As shown in FIG. 3, the channel member 40 has a length that is shorter than the length of the second edge 24 of the frame 18, and therefore shorter than the length of the rail 36. In FIG. 3, multiple channel members 40 are secured along the length of the frame 18 of the rail.

The panels 14 may be reversible in orientation. A user may selectively secure a channel member 40 to either long edge 22, 24 of the panel 14. As described above, the channel member 40 is configured to engage the rail 36 of an adjacent panel when the door is in the closed position. Accordingly, a user may secure channel members to all of the first long edges of the panels in a door, and leave the second long edges of the doors without channel members. Alternatively, a user may secure channel members to all of the second long edges of the panels in a door, and leave the first long edges of the doors without channel members. Alternatively, in some embodiments, a user may secure channel members to both the first long edge and the second long edge of each panel, as long as the channel members of adjacent panels are segments that do not overlap with each other when a first long edge of a first panel directly engages a second long edge of a second panel.

Without the removable channel member 40, each of the panels would have a "top edge" and a "bottom edge," or other dedicated edge for engaging a specific counterpart surface on another panel. In contrast, the removable channel members 40 of the present disclosure allow a user to determine which edge of the panel should include a channel member when installing the panels or when replacing a single panel.

Another advantage of garage doors of the present disclosure is that the panels 14 of the present disclosure allow for increased efficiency of manufacturing the panels 14. Each long edge 22, 24, of the panel includes the same long edge wall that may be extruded as a single piece and cut to form the panel frame 18. Then a user may fasten the channel member 40 to the desired long edge of the panel 14. There is no special mold or tooling required to form a channel member directly on the first or second long edge of the panel frame.

The engagement of the channel member 40 of one of the panels 14 and the rail 36 of the adjacent panel 14 keep the adjacent panels 14 from deflecting under extreme high pressure, such as due to wind during hurricane conditions.

Figure 4:
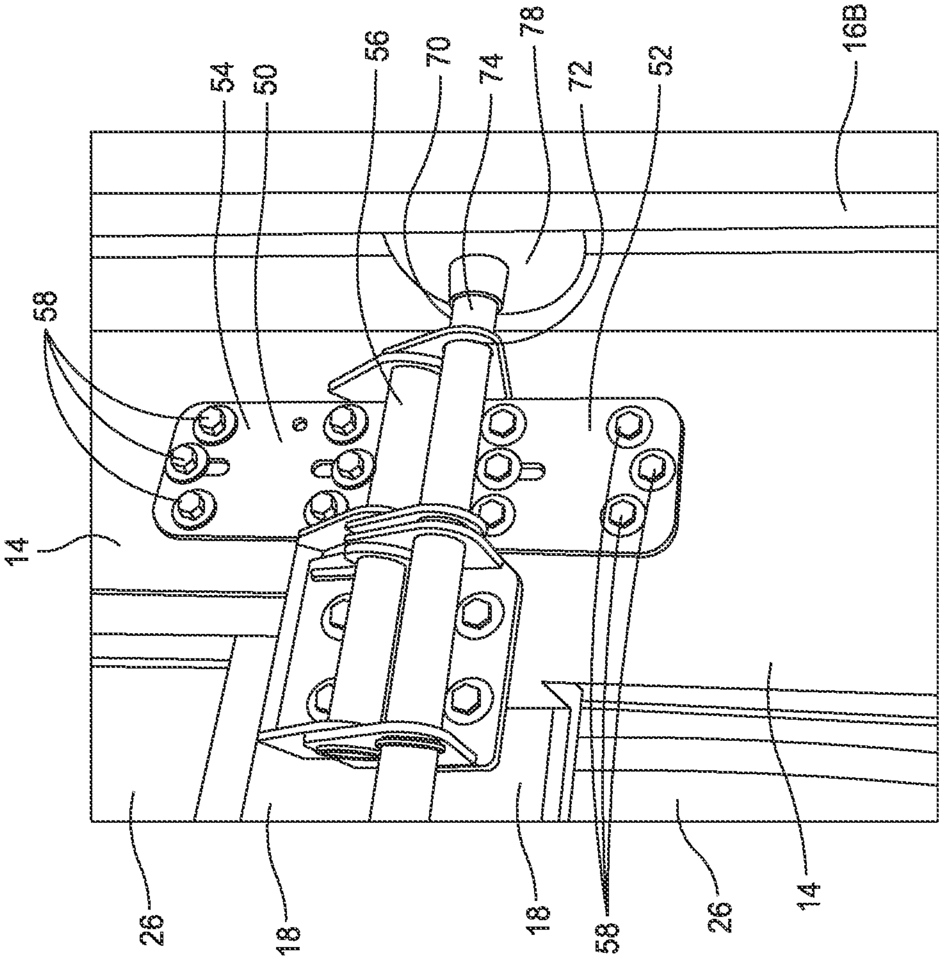
FIG. 4 is a perspective view of a hinge and a roller of the garage door roller assembly of FIG. 1.
Figure 7:
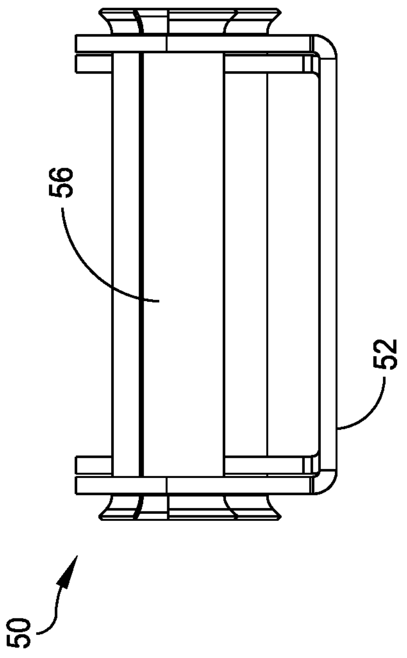
FIG. 7 is a front view of the hinge of FIG. 5.
Figure 6:
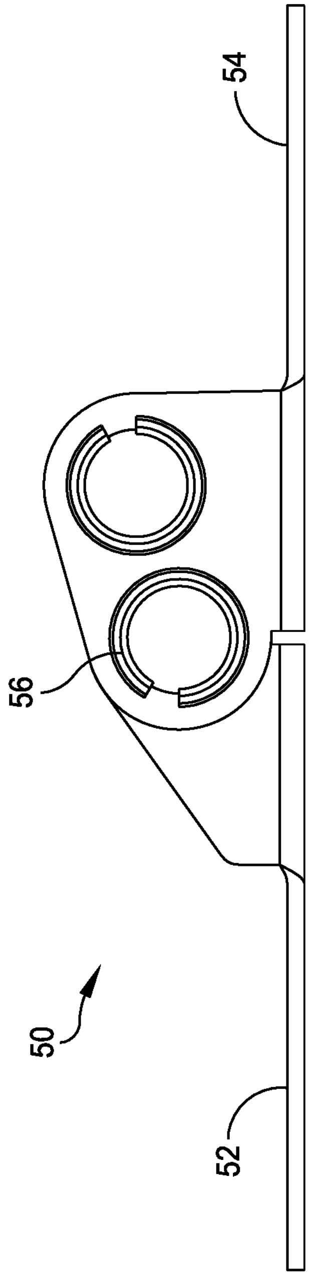
FIG. 6 is a left side view of the hinge of FIG. 5.
Figure 5:
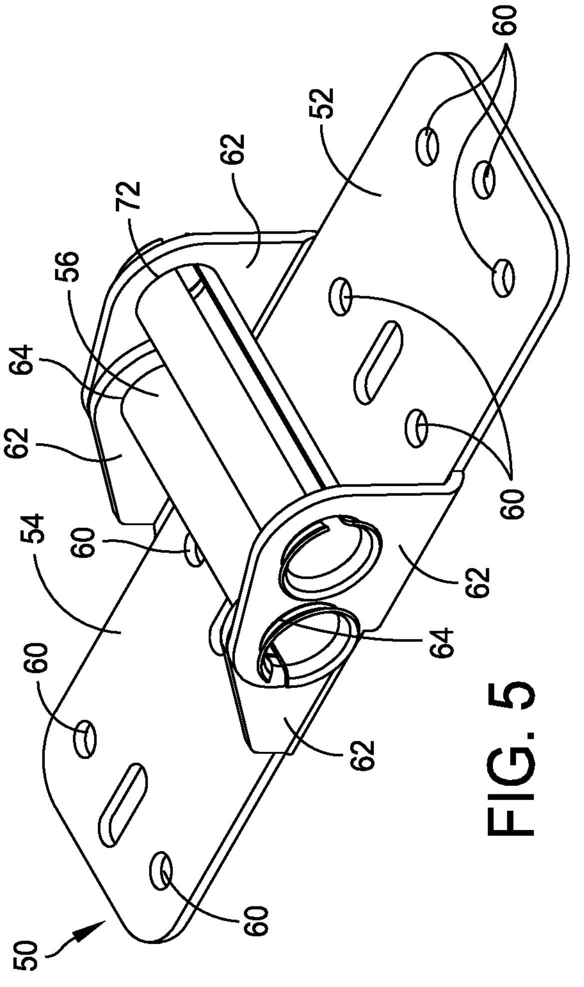
FIG. 5 is a perspective view of a hinge.
Figure 8:
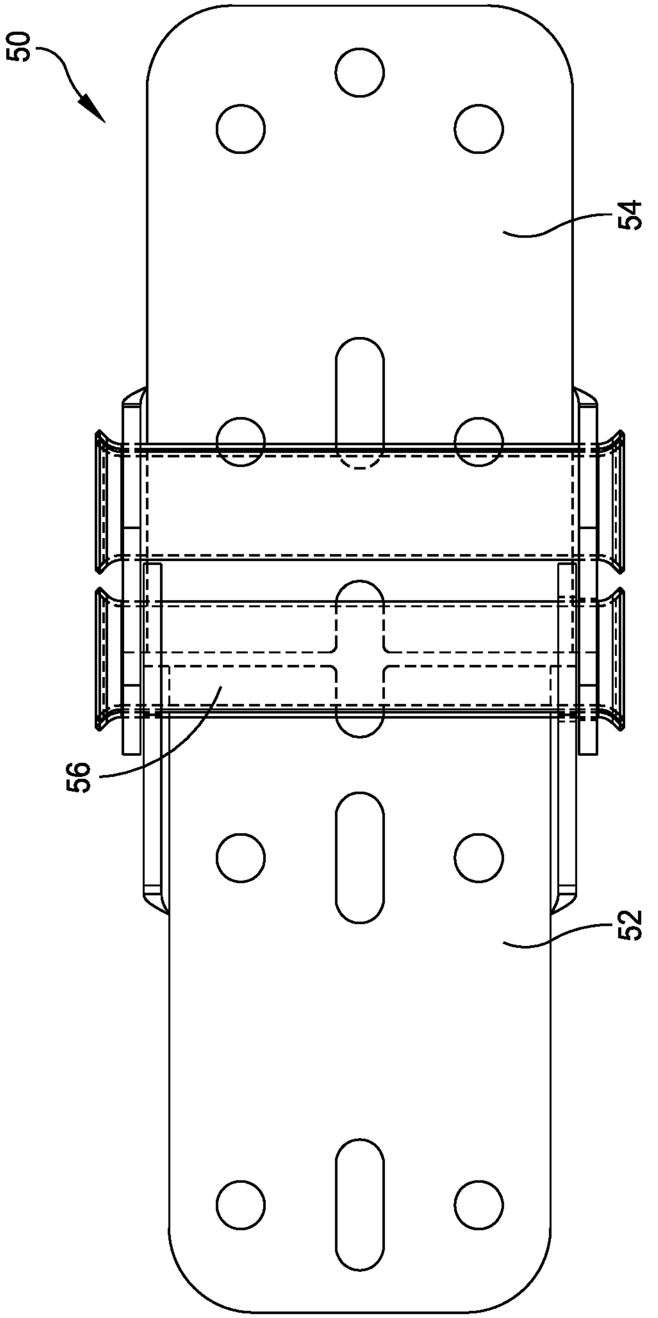
FIG. 8 is a top view of the hinge of FIG. 5.
Figure 9:
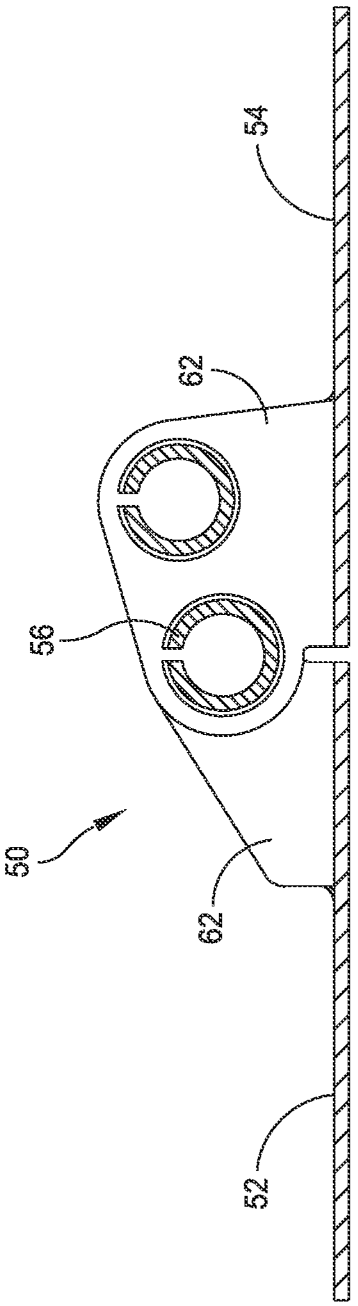
FIG. 9 is a right side of the hinge of FIG. 5.

Turning now to FIG. 4 and to FIGS. 5-9, the panels 14 are connected by hinges, with a hinge being generally indicated at 50. Each hinge 50 includes a first plate 52 and a second plate 54 that are rotatably connected by a pin 56. The first plate 52 may be secured to a first one of the panels 14, and the second plate 54 may be secured to a second one of the panels 14. The first plate 52 and the second plate 54 may be secured to the panels 14 by one or more fasteners 58 extending through one or more fastener holes, each indicated at 60, defined in the respective first plate 52 and second plate 54 as shown in FIG. 5.

The first plate 52 and the second plate 54 each have a substantially rectangular shape. The first plate 52 and the second plate 54 include rounded corners. Because the first plate 52 and the second plate 54 have a substantially rectangular shape, the first and second plates 52, 54 provide increased surface area for attachment to the frame 18 of each panel 14, as compared to prior art hinges on door panels. The increased surface area of the hinges 50 improves the stability of the door 12 when the door 12 is in the closed position, in the open position, or moving between the open position and the closed position.

To secure the hinge plates 52, 54 to the pin 56 of the hinge 50, each hinge plate 52, 54 includes a pair of flanges, each indicated at 62, extending upwardly from the respective plate 52, 54. A first opening 64 is defined in each flange 62. The first opening 64 is configured to receive the pin. When the first openings 64 of the flanges 62 of the first plate 52 and the first openings 64 of the flanges 62 of the second plate 54 are aligned and when the pin 56 is received in the first openings 64, the first plate 52 is rotatable with respect to the second plate 54 about an axis of the pin 56.

Referring again to FIG. 4, the hinge 50 supports a roller, generally indicated at 70, and embodiment of the present disclosure. To secure a roller 70 to the first plate 52, each flange 60 of the first plate 52 includes a second opening 72. The second openings 72 are configured to receive a portion of the roller 70, as described in further detail below.

The hinge plates 52, 54 and the pin 56 may be made from a variety of materials. In some embodiments, the hinge plates 52, 54 and the pin 56 are made of metal, such as stainless steel.

FIGS. 5-9 show the hinge 50 configured to be secured to panels 14 of the garage door system 10.

Figure 10:
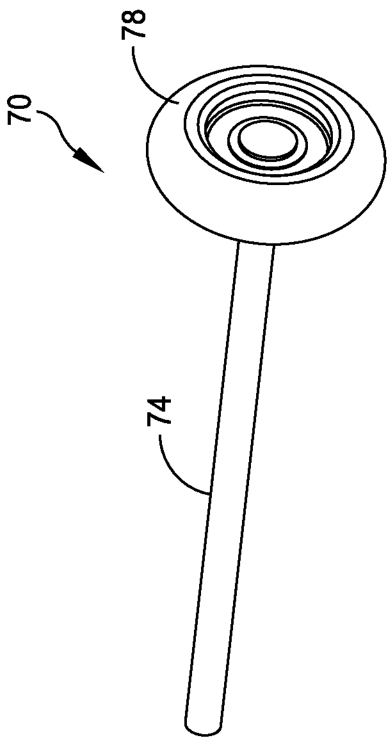
FIG. 10 is a perspective view of the roller of FIG. 4.
Figure 12:
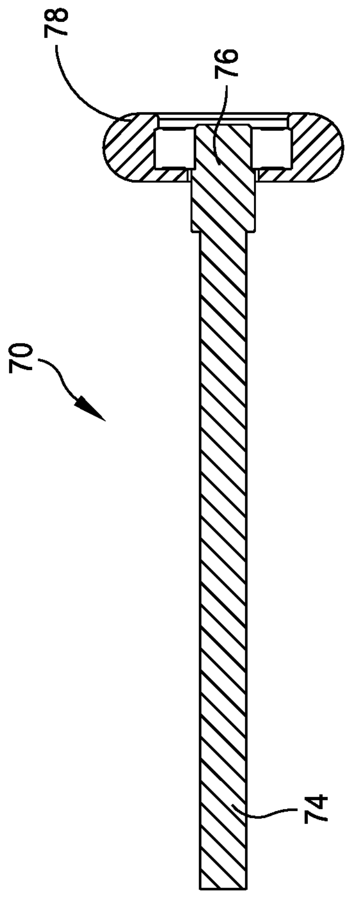
FIG. 12 is a cross-sectional view of the roller of FIG. 4.
Figure 11:
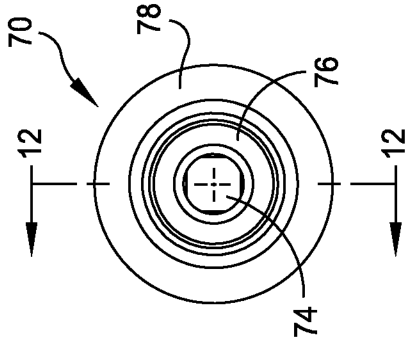
FIG. 11 is an end view of the roller of FIG. 4.

Turning now to FIGS. 10-12, FIG. 10 shows a perspective view of the roller 70 of the present disclosure. To allow each panel 14 to travel along a respective one of the tracks 16A, 16B, each panel 14 is supported on at least one roller 70 configured to roll along the respective track 16A, 16B. As shown and described in relation to FIG. 4, in some embodiments, each roller 70 is supported on a respective one of the hinges 50. In this way, the panels 14 of the door 12 are movable together along the respective tracks 16A, 16B, which may include one or more curved portions as described herein.

Each roller 70 is formed as a unitary structure. As shown in FIG. 10, in a certain embodiment, the roller 70 includes a first portion 74 securable to one of the hinges and a second portion 76 that is configured to have a roller insert, such as a roller insert fabricated from polyurethane, nylon, or another suitable material.

In some embodiments, the first portion 74 has a cylindrical shape having a first diameter configured to be rotatably received in a bushing that is received in the second openings 72 of the flanges 62 of the first hinge plate 52. In some embodiments, the first portion 74 has a diameter of 0.75 inch.

In some embodiments, the first portion 74 of the roller 70 is a single integrally formed piece that is integrally formed with the second portion 76, with the second portion having a diameter that is larger than the first portion. In such embodiments, rollers 70 of the present disclosure exhibit increased resistance to bending failure compared to prior art rollers. As shown, the second portion 76 includes a roller insert 78 that is received within the track 16A or 16B.

In some embodiments, the roller insert 78 has an annular shape configured to be received in a respective one of the tracks 16A, 16B. The roller insert 78 is configured to roll along the respective track, as described in further detail herein.

Together, the rollers 70, the hinges 50, the rail 36, and the channel member 40 allow the panels 14 of the door 12 to be moved between the open position and the closed position. A pair of adjacent panels 14 is configured to sealingly engage each other when the door 12 is in the closed position and to disengage each other when the door 12 moves along a curved portion of the tracks 16A, 16B. When two adjacent panels 14 of the door 12 move along a curved portion of the tracks 16A, 16B, the rail 36 of the first panel 14 disengages from the internal surface 48 of the channel member 40 of the second panel 14, allowing the panels 14 to rotate with respect to each other. Once the rollers 70 of both panels 14 are all on the same straight section of the tracks 16A, 16B, the rail 36 of the first panel is again received within the channel member 40 of the second panel 14 and the strips of sealing material 32 of the adjacent panels are in direct facing relation with each other. Accordingly, a user may easily move the door 12 between the open position and the closed position, and the structure of the door 12 ensures proper alignment and proper sealing between the adjacent panels 14 when the door 12 is returned to the closed position.

A garage door system according to the present disclosure has structural advantages over other garage door systems. Garage door systems of the present disclosure help ensure proper alignment of the panels of the garage door. Garage door systems of the present disclosure provide improved resistance of the garage door to wind. Garage door systems of the present disclosure provide improved resistance of the garage door to the elements, such as rain.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A garage door system, comprising:

a first panel assembly including a first panel and a first frame subassembly configured to support the first panel, the first frame subassembly having a first long edge, a second long edge, a first end portion including a first planar surface, a first recess defined in the first planar surface, and a first rail extending from a trough of the first recess, the first rail having a height that is less than a depth of the first recess;

a second panel assembly including a second panel and a second frame subassembly configured to support the second panel, the second frame subassembly having a third long edge, a fourth long edge, a second end portion including a second planar surface, a second recess defined in the second planar surface, and a second rail extending from a trough of the second recess, the second rail having a height that is less than a depth of the second recess;

a hinge connecting the first panel assembly and the second panel assembly;

a channel member separate from the first panel assembly and the second panel assembly, the channel member being secured to the second rail, the channel member extending beyond the second planar surface of the second end portion and being configured to receive the first rail, the channel member including a first channel wall and a second channel wall together being configured to receive the first rail therebetween;

a first sealing member configured to seal the first long edge of the first panel assembly and the third long edge of the second panel assembly;

a second sealing member configured to seal the second long edge of the first panel assembly and the fourth long edge of the second panel assembly;

a third sealing member provided on the first channel wall, the third sealing member being configured to form a seal between the first channel wall and an internal surface of the trough of the first recess when the third sealing member engages the internal surface; and a fourth sealing member provided on the second channel wall, the fourth sealing member being configured to form a seal between the second channel wall and the internal surface of the trough of the first recess when the fourth sealing member engages the internal surface.

2. The garage door system of claim 1, wherein the channel member is secured to the second rail by a fastener.

3. The garage door system of claim 1, further comprising at least one roller, wherein the at least one roller includes of a first portion having a first diameter rotatably secured to the hinge; and a second portion having a second diameter greater than the first diameter of the first portion, wherein the first portion is integrally formed with the second portion.

4. The garage door system of claim 1, wherein the hinge includes a first plate secured to the first panel assembly and a second plate secured to the second panel assembly, the first plate having a shape that is at least substantially rectangular and the second plate having a shape that is at least substantially rectangular.

5. The garage door system of claim 4, further comprising at least one roller, wherein the at least one roller includes of a first portion having a first diameter rotatably secured to the hinge; and a second portion having a second diameter greater than the first diameter of the first portion, wherein the first portion is integrally formed with the second portion.

6. The garage door system of claim 5, wherein the first plate includes a pair of flanges configured to support the roller.

7. The garage door system of claim 1, further comprising two tracks positioned on opposite sides of the first panel assembly.

8. The garage door system of claim 1, wherein the channel member is configured to allow the first rail to disengage the channel member when the first panel assembly and the second panel assembly are rotated away from each other.

9. A garage door system comprising:

two tracks mounted adjacent a garage door opening; and a garage door assembly including at least a first panel assembly including a first panel and a first frame subassembly configured to support the first panel, the first frame subassembly having a first long edge, a second long edge, a first end portion including a first planar surface, a first recess defined in the first planar surface, and a first rail extending from a trough of the first recess, the first rail having a height that is less than a depth of the first recess;

a second panel assembly including a second panel and a second frame subassembly configured to support the second panel, the second frame subassembly having a third long edge, a fourth long edge, a second end portion including a second planar surface, a second recess defined in the second planar surface, and a second rail extending from a trough of the second recess, the second rail having a height that is less than a depth of the second recess;

a hinge connecting the first panel assembly and the second panel assembly;

a channel member separate from the first panel assembly and the second panel assembly, the channel member being secured to the second rail, the channel member extending beyond the second planar surface of the second end portion and being configured to receive the first rail, the channel member including a first channel wall and a second channel wall together being configured to receive the first rail therebetween;

a first sealing member configured to seal the first long edge of the first panel assembly and the third long edge of the second panel assembly;

a second sealing member configured to seal the second long edge of the first panel assembly and the fourth long edge of the second panel assembly;

a third sealing member provided on the first channel wall, the third sealing member being configured to form a seal between the first channel wall and an internal surface of the trough of the first recess when the third sealing member engages the internal surface; and a fourth sealing member provided on the second channel wall, the fourth sealing member being configured to form a seal between the second channel wall and the internal surface of the trough of the first recess when the fourth sealing member engages the internal surface.

10. The garage door system of claim 9, wherein the channel member is secured to the second rail by a fastener.

11. The garage door system of claim 9, further comprising at least one roller, wherein the at least one roller includes a first portion having a first diameter rotatably secured to the hinge; and a second portion having a second diameter greater than the first diameter of the first portion, wherein the first portion is integrally formed with the second portion.

12. The garage door system of claim 9, wherein the channel member is configured to allow the first rail to disengage the channel member when the first panel assembly and the second panel assembly are rotated away from each other.

* * * * *